Apr. 3, 1923.  1,450,711

L. W. BUGBEE

PROCESS OF MAKING A FUSED BIFOCAL

Filed Apr. 29, 1921

Inventor
LUCIAN W. BUGBEE.

By

Attorneys.

Patented Apr. 3, 1923.

1,450,711

UNITED STATES PATENT OFFICE.

LUCIAN W. BUGBEE, OF INDIANAPOLIS, INDIANA, ASSIGNOR TO FRANKLIN OPTICAL COMPANY, OF INDIANAPOLIS, INDIANA, A CORPORATION OF INDIANA.

PROCESS OF MAKING A FUSED BIFOCAL.

Application filed April 29, 1921. Serial No. 465,582.

*To all whom it may concern:*

Be it known that I, LUCIAN W. BUGBEE, a citizen of the United States, and a resident of Indianapolis, county of Marion, and State of Indiana, have invented a certain new and useful Process of Making a Fused Bifocal; and I do hereby declare that the following is a full, clear, and exact description thereof, reference being had to the accompanying drawings, in which like numerals refer to like parts.

This invention relates to a new process of making fused bifocal or Kryptok lenses in which the chief novel feature is the use, for the reading segment insert, of nodules or large particles or small fragments of flint glass or other glass of a higher index of refraction than the body of the lens. The usual recess made in the crown glass portion of the lens is filled with nodules of flint glass, and then the whole is subjected to sufficient heat to melt the nodules of glass into a homogenous mass and fuse the same with the crown glass.

Figure 1:
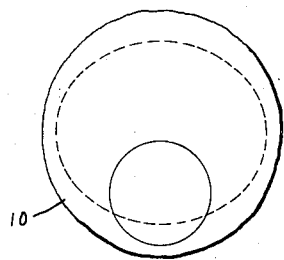
Figure 2:
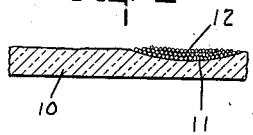
Figure 5:
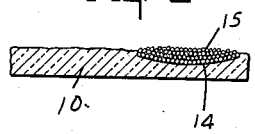
Figure 3:
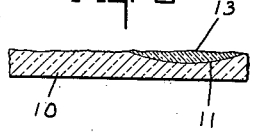
Figure 6:
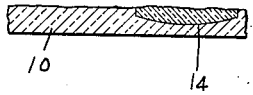
Figure 4:
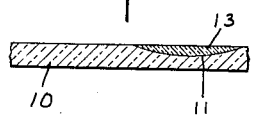
Figure 7:
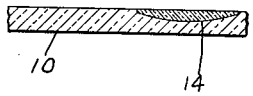

The full nature of the invention will be understood from the accompanying drawings and following description and claims:

In the drawings, Fig. 1 is a plan view of a fused bifocal blank with the outline of the finished lens indicated by a dotted line. Fig. 2 is a cross section of a plano blank prior to fusing. Fig. 3 is the same after fusing. Fig. 4 is the same after the same is ground and polished. Figs. 5, 6 and 7 correspond with Figs. 2, 3 and 4, excepting a modified form of the recess in the main portion of the lens.

Heretofore it has been practically difficult in the art of making fused bifocal or Kryptok lenses or lens blanks with the reading segment formed of flint glass of a relatively high index, because of the greater predominance of striæ, bubbles and other defects in flint glass of that quality as compared with the flint glass ordinarily used in making such lenses. Also it has been difficult to make the reading segment of colored flint glass with a uniform color, because it is difficult to obtain a sufficiently large mass of flint glass with uniform color. The result has been that the manufacture of fused lenses with the reading segment made of flint glass of high index or with color has not been practical, although for some uses and needs, they are desirable.

The object of this invention is to meet this need in a practical and satisfactory manner. In the process of making such fused bifocal lenses, the main portion 10 of the lens is made of crown glass or the like and then a recess 11 formed for receiving the reading segment insert of flint glass. Instead of a solid mass of flint glass, in carrying out this process, we break up the flint glass, preferably such as has a very high index of refraction, into small particles and separate therefrom the unsatisfactory or defective particles which have in them striæ or bubbles, and the perfect particles are then preferably rounded by revolving them as a mass in a container until the angular portions are broken and rubbed away, leaving relatively rounded nodules 12. The dust and minor particles are sifted out of the mass and the relatively rounded nodules which are perfect glass are placed in the recess 11 in the main portion of the lens, as shown in Fig. 2. A sufficient number of nodules are filled in said recess to make the mass of them extend above the ultimate level of the surrounding crown glass somewhat. Then the glass blank with the nodules in the recess are subjected to heat sufficient to cause the nodules to fuse together and with the main portion of the lens and produce a homogenous solid mass of flint glass 13, as seen in Fig. 3, free from imperfections. Then the blank is ground and polished, as shown in Fig. 4. In this manner a fused bifocal lens can be made which has a reading segment of a higher index than that usually found in such lenses.

In making a fused lens which is colored, the flint glass, which is difficult to make with uniform color in it, is broken up and the portions or small particles thereof are classified according to color and those of a uniform color are employed in the manner and according to the process above outlined. The result is a fused bifocal lens with the reading segment having uniform color.

In Figs. 5, 6 and 7 the same process is followed excepting that the recess 14 in the main portion of the lens has an angular rectangular wall or shoulder 15 surrounding it and extending at a right angle to the main portion of the lens. When the lens is ground and polished there still remains such shoulder. This form of lens is made to avoid the sharp thin feather edge of the reading segment 13 found in the form shown in Figs. 2 to 4.

In addition to the advantages of this new process above mentioned, there is the further advantage of cheapness, for it is unnecessary in this process for the curved surface of the flint glass insert to be ground and polished to fit in the recess, as is the common practice and which is necessary in making good lenses according to the process heretofore employed.

The invention claimed is:

1. In the process of making fused bifocal lenses, placing upon the main portion of the lens a circular group of nodules of glass of a relative high index of refraction, and then fusing said nodules to said main portion of the lens for forming the reading segment.

2. The process of making fused bifocal lenses, which process consists in forming the main portion of the lens with a recess in one side thereof, filling said recess with nodules of glass of a higher index of refraction than the main portion of the lens, subjecting the same to heat sufficient to fuse the nodules into a homogenous mass and unite said mass with the main portion of the lens, and thereafter grinding and polishing the lens.

3. The process of making fused bifocal lenses, which includes forming the main portion of the lens with a recess in one side thereof, crushing glass of a higher index of refraction than the main portion of the lens into small particles, abrading said particles to form roughly rounded nodules, filling said recess with said nodules, heating the same until said nodules fuse together and also unite with the main portion of the lens, and afterwards grinding and polishing the lens.

4. The process of making fused bifocal lenses, which process includes forming the main portion of the lens with a recess in one side thereof, crushing glass of a higher index of refraction than the main portion of the lens into small particles, abrading said particles to form roughly rounded nodules, separating said nodules from the remainder of said crushed glass and filling said recess therewith, heating the same until said nodules fuse together and also unite with the main portion of the lens, and afterwards grinding and polishing the lens.

5. The process of making fused bifocal lenses, which process includes forming the main portion of the lens with a recess in one side thereof which is surrounded by a shoulder, filling the recess with nodules of glass of a higher index of refraction than the main portion of the lens, subjecting the same to heat sufficiently to fuse the nodules into a homogenous mass and unite said mass with the main portion of the lens, and thereafter grinding and polishing the lens so as to leave said shoulder in the main portion of the lens and the margin of the other portion of the lens being correspondingly thick.

In witness whereof, I have hereunto affixed my signature.

LUCIAN W. BUGBEE.